US005203926A

United States Patent [19]

Bondurant

[11] Patent Number: 5,203,926

[45] Date of Patent: Apr. 20, 1993

[54] CLEANSER AND DESENSITIZER FOR PRINTING EQUIPMENT

[76] Inventor: Louis E. Bondurant, P.O. Box 2074, Middleburg, Va. 22117

[21] Appl. No.: 847,328

[22] Filed: Mar. 6, 1992

[51] Int. Cl.[5] ........................ B41F 35/04; C09D 5/20; C11D 7/20; C11D 7/50

[52] U.S. Cl. ........................................ 134/42; 101/424; 101/451; 106/2; 134/32; 134/34; 252/136; 252/139; 252/140; 252/143; 252/144; 252/164; 252/167; 252/173; 252/174.17; 252/174.25

[58] Field of Search .................... 106/2; 101/424, 451; 134/32, 34, 42; 252/136, 139, 140, 143, 144, 164, 167, 173, 174.17, 174.25

[56] References Cited

U.S. PATENT DOCUMENTS

| | | | |
|---|---|---|---|
| 2,770,600 | 11/1956 | Ricciardi | 252/131 |
| 3,398,002 | 8/1966 | Bondurant | 106/2 |
| 4,063,893 | 12/1977 | Stoulil | 134/42 |
| 4,109,049 | 8/1978 | Thompson | 428/331 |
| 4,182,686 | 1/1980 | Laks | 252/119 |
| 4,687,591 | 8/1987 | Castaldo | 252/90 |
| 4,704,222 | 11/1987 | Smith | 252/106 |
| 4,769,072 | 9/1988 | Bondurant | 106/2 |
| 4,828,743 | 5/1989 | Rahfield | 252/87 |
| 4,880,555 | 11/1989 | Walls | 252/143 |
| 5,054,394 | 10/1991 | Zweig | 101/451 |

*Primary Examiner*—Dennis Albrecht
*Attorney, Agent, or Firm*—Raymond N. Baker

[57] ABSTRACT

A cleansing solution for cleaning components of a planographic printing press to include the printing plate, which includes a solution of a humectant, a buffer, a glycol ether and an organic solvent to which anhydrous aluminum silicate and gum arabic have been added.

7 Claims, No Drawings

CLEANSER AND DESENSITIZER FOR PRINTING EQUIPMENT

BACKGROUND OF INVENTION

Planographic printing involves the preparation of a flexible printing plate having water-receptive nonprint areas and water-repellent ink-receptive areas constituting an image to be reproduced. The plate is moistened with an aqueous liquid which is repelled by the image but coats the non-image areas. This renders and maintains the non-image areas of the plate ink free.

In most printing processes, ink is transferred from the image on the printing plate to a copy sheet by an offset blanket to thereby form a reproduction of the image on the copy sheet. The moistening, inking and transfer operations are successively repeated for the production of large numbers of copies.

The aforementioned aqueous liquid is identified as a "fountain solution" in the printing arts. The fountain solution is stored in a container and delivered to the printing plate by a system which includes one or more chrome rollers. The ink is likewise delivered to the printing plate by a series of rollers. Examples of a popular fountain solution are described in U.S. Pat. No. 3,398,002, and U.S. Pat. No. 4,769,072, each of which are incorporated herein by reference. The ink and fountain solutions are continuously fed to the printing plate during the printing process. After a certain number of images have been printed, the printing plate will become "tired", as this term is known and used in the printing art, and the sharpness and clarity of the printing suffers. This can be caused by ambient dust, specks of ink and other foreign substances that accumulate over time.

FIELD OF INVENTION

The products of this invention provide the printing arts with new and improved cleansers for the printing plates and the chrome cylinders used therewith. The products are compatible with fountain solutions known to the prior art and use many constituents thereof together with components that add cleansing effectiveness and provide means to provide a preservative coating.

This invention is a single-step printing plate cleanser which can also be used as a chrome cylinder cleanser and desensitizer and to the methods of using such cleansers.

SUMMARY OF THE INVENTION

In many instances, printing presses experience several color changes in a single day. This increases the risk of foreign ink specks gathering on the roller and/or printing plate. In such instances, it is advisable that the chrome rollers and printing plate be periodically cleansed thoroughly so that they will continue to maintain the rollers' ability to be receptive to water and to reject ink respectively. The passive (hydrophilic) chrome rollers are provided to improve "damping" control. Hydrophilic rollers minimize ink feedback but are not perfect in this regard. Good printing will result only if ink feedback is prevented. The ability of the roller to remain free of ink is increased if the rollers and the printing plate are clean and fresh.

Therefore, an important objective of the product of this invention is to maintain the rollers clean and fresh so as to prevent ink from sticking to the chrome rollers. This is aided by the invention's desensitizing characteristics.

Another important objective of the invention is to protect chrome rollers from oxidation and corrosion by permitting a small coating of the cleanser to remain after treatment.

A further objective of the invention is to reduce clean-up time. After treatment, the cleanser of this invention leaves a protective film on the rollers which will diminish the chance of corrosion and chromium oxidation and, as a result, will extend the life of the rollers.

A still further objective of the invention is to provide a solution for one-step cleaning of the printing plate so that dirt is easily removed. Also, oxidation, smudges and other imperfections can be removed from the plate surface without scratching or abrading. The cleanser of this invention reaches such an objective without utilizing pumice or glass wax which are commonly utilized in prior art cleansers but can have destructive characteristics.

Another important objective of the invention is to provide a plate cleaner which is completely compatible with popular fountain solutions of the type currently used.

The product described herein is remarkable in its ability to salvage and to revive old, smudged and tired plates. The usefulness of the plates can be extended for a considerable time. The cleansers oftentimes serve to eliminate the time and expense of making new plates for the same printing assignment. The reason the cleansing solution of this invention can accomplish this objective is that it is not only a cleanser, but in effect, a short term preservative.

Another objective of the invention is to provide a solution that is easily used by inexperienced operators. The cleanser is merely applied to a clean cloth and the cloth is wiped across the printing plate. Cleaning and reviving are accomplished as the wiping occurs. After completing this task, the press operator can drop the dampeners and the press is ready to print. There is no need to wipe the plate clean before running because the cleanser is compatible with the fountain solutions used in the printing processes. In fact, the light film remaining on the treated surface acts as a preservative.

These and other objectives of the invention will be more readily understood from a reading of the following specification and claims.

DESCRIPTION OF THE INVENTION

The formulation of this invention is based on an aqueous solution comprised of deionized water, a monobasic alkali metal phosphate such as monopotassium phosphate, monoammonium phosphate or monosodium phosphate. The solution also includes alcohol, such as ethyl alcohol, n-propyl alcohol or isopropyl alcohol; a polyhydric alcohol humectant such as ethylene glycol, glycerin or propylene glycol; and, ethylene glycol monobutyle ether. Added to the above are phosphoric acid, an anhydrous aluminum silicate (Kaopolite), litho gum (gum arabic) and/or dye solantine turquoise. This composition is compatible with the aforementioned fountain solutions.

Isopropyl alcohol is a solvent and is useful for purposes of removing gums and other oily substances from the plate or the rollers. Mineral spirits, also called white solvents, work well in conjunction with the isopropyl alcohol for the removal of grease and gums of which the alcohol is not particularly adapted to dissolve.

The amount of buffer, such as monopotassium phosphate, used is dependent to a large extent on the amount of non-aqueous materials that are used. The buffer serves to maintain the desired pH of the cleanser which will be designed to match the pH of the fountain solution used by the operator. Glycerine acts as a deliquescent and as a humectant.

Kaopolite is a very fine powder that mildly agitates the printing plate surface to aid in the cleaning thereof. The gum arabic provides a very light coating over the plate surface and acts as a preservative. Solantine turquoise is a dye that is used for identification purposes.

The following is an example of one preferred solution in terms of percentage by weight for cleaning and revitalizing printing plates or for cleaning chrome rollers:

EXAMPLE I

| | Percent |
|---|---|
| Monopotassium phosphate | 2.0 |
| Isopropyl alcohol | 7.0 |
| Glycerine | 12.0 |
| Ethylene glycol monobutyl ether | 8.0 |
| Phosphoric acid | 0.2 |
| Mineral spirits | .5 |
| Powdered anhydrous aluminum silicate | .78 |
| Litho Gum (gum arabic) | .05 |
| Solantine turquoise | 5 g/1000 lb |
| Balance Deionized Water | |

In preparing the above solution, the monopotassium phosphate is added to the deionized water and thoroughly mixed therewith. After this buffer is added, the remaining liquid ingredients are added and thoroughly mixed. Then, the other products are added. Although the aforementioned formulation has found acceptance in the marketplace, the percentages indicated can be varied without detracting from the invention's usefulness. The solution of Example I has been found useful for cleaning and treating both printing plates and the chrome rollers.

In order that the user can have a separate source of product for the printing plate and a separate source for the hydrophilic chrome rollers, 5 grams of FD & E red dye per 1,000 lbs of solution is added to the source for the rollers. This trace amount of dye serves to identify the product as that designed for roller cleansing. When this product is specifically made for the rollers, the mineral spirits can be eliminated. The following is a cleanser particularly well suited for rollers.

EXAMPLE II

| | Percent |
|---|---|
| Monopotassium phosphate | 2.0 |
| Isopropyl alcohol | 7.0 |
| Glycerine | 12.0 |
| Ethylene glycol monobutyl ether | 8.0 |
| Phosphoric acid | 0.2 |
| Powdered anhydrous aluminum silicate | .78 |
| Litho Gum (gum arabic) | 1.5 |
| Sulantine turquoise | 5 g/1000 lb |
| Balance Deionized Water | |

Other tests were made with minimum amounts of monopotassium phosphate, isopropyl alcohol, glycerine and ethylene glycol monobutyl either.

EXAMPLE III

| | Percent |
|---|---|
| Monopotassium phosphate | .5 |
| Isopropyl alcohol | 2.0 |
| Glycerine | 1.5 |
| Ethylene glycol monobutyl ether | 8.0 |
| Phosphoric acid | 0.2 |
| Mineral spirits | .5 |
| Powdered anhydrous aluminum silicate | .78 |
| Litho Gum (gum arabic) | .05 |
| Balance Deionized Water | |

As one would expect, the diminished amounts of active ingredients reduced the efficiency of the solution but nevertheless the Example III solution was completely compatible with the fountain solutions commonly used and the Kaopolite and gum arabic accomplished their assigned tasks.

One preferred embodiment of the cleanser of this invention has been found to comprise 2% to 25% by weight of an alcohol, plus 0.5% to 5% by weight of a buffer, plus 1.5% to 25% by weight of a polyhydric alcohol hemectant, plus 0.5% to 28% by weight of ethylene glycol monobutyl ether, plus 0.2% to 7.5% by weight of finely powdered anhydorous aluminum silicate, plus 0.2% to 5% by weight of gum arabic, plus 0.2% to 12% mineral spirits, and the balance being water.

It will thus be seen from the foregoing description that the present invention comprises a product which extends the usefulness of printing plates and chrome rollers through many printing cycles. It will also be seen that a cleanser prepared according to the present invention accomplishes the intended objects and has the desirable advantages and characteristics, including those hereinbefore pointed out, and others, which are inherent in the invention.

Since certain changes may be made in the above formulations and processes without departing from the scope of the invention herein involved, it is intended that all matter contained in the above description shall be interpreted as illustrative and not in limiting sense.

I claim:

1. A cleanser for use with printing plates and chrome rollers comprising:

2% to 25% by weight of an alcohol selected from the group consisting of isopropyl alcohol, ethyl alcohol and n-propyl alcohol;

0.5% to 5% by weight of a buffer comprising a mono basic alkali metal phosphate selected from the group consisting of monopotassium phosphate, monoammonium phosphate and monosodium phosphate;

1.5% to 25% by weight of a polyhydric alcohol humectant selected from the group consisting of ethylene glycol, glycerin and propylene glycol;

0.5% to 28% by weight of ethylene glycol monobutyl ether;

0.2% to 7.5% by weight of finely powdered anhydrous aluminum silicate;

0.2 to 5% by weight of gum arabic;

0.2% to 12% mineral spirits; and the balance being water.

2. The cleanser of claim 1 wherein a solantine turquoise dye is added.

3. The cleanser of claim 1 wherein said water is deionized.

4. The cleanser of claim 1 wherein said alcohol is isopropyl and said percentage by weight of isopropyl alcohol is approximately 7%.

5. The cleanser of claim 1 wherein said humectant is glycerine and percentage by weight of glycerine is approximately 12%.

6. The cleanser of claim 1 wherein said percentage by weight of ethylene glycol monobutyl, ether is approximately 8%.

7. A method for cleaning a printing plate to thereby increase its effectiveness of printing quality comprising the step of wiping the printing plate with a cloth having been wetted with a solution having 2% to 25% by weight of an alcohol selected from the group consisting of isopropyl alcohol, ethyl alcohol and n-propyl alcohol;

0.5% to 5% by weight of a buffer comprising a mono basic alkali metal phosphate selected from the group consisting of monopotassium phosphate, monoammonium phosphate and monosodium phosphate;

1.5% to 25% by weight of a polyhydric alcohol humectant selected from the group consisting of ethylene glycol, glycerin and propylene glycol;

5% to 28% by weight of ethylene glycol monobutyl ether;

0.2% to 7.5% by weight of powdered anhydrous aluminum silicate;

0.2 to 5% by weight of gum arabic;

0.2% to 12% mineral spirits; and the balance being water.

* * * * *